J. P. COURTNEY.
Pins for Jewelry Ornaments.
No. 145,990. Patented Dec. 30, 1873.
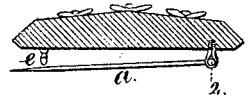
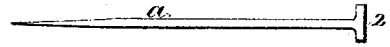
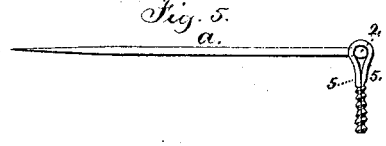
Witnesses
Chas H Smith
Harold Serrell
Inventor
John P. Courtney
per Lemuel W. Serrell
Atty

UNITED STATES PATENT OFFICE.

JOHN P. COURTNEY, OF BROOKLYN, NEW YORK.

IMPROVEMENT IN PINS FOR JEWELRY ORNAMENTS.

Specification forming part of Letters Patent No. 145,990, dated December 30, 1873; application filed November 17, 1873.

*To all whom it may concern:*

Be it known that I, JOHN P. COURTNEY, of Brooklyn, in the county of Kings and State of New York, have invented an Improvement in Pins for Jewelry Ornaments, &c., of which the following is a specification:

The pins or tongues of breast-pins or other ornaments have been usually made with an eye or short cylinder soldered upon the end of the pin, and through this the joint-wire is passed, forming, with the socket or butt, a hinge. This is expensive and not adapted to jet and other ornaments. A bent wire has also been used for the pin.

My invention relates to a screw-eye and stop, made out of a plate of metal folded double, such screw-eye being adapted to screw into the ornament, and carrying the pointed pin or tongue, the stop upon said eye determining the movement of the pin, and holding it so that it will spring below the catch in fastening the pin. The pin itself is made with a T end at the joint entering such screw-eye.

In the drawing, Figure 1 represents the pin as applied to an ornament. Fig. 2 shows the T-ended pin. Fig. 3 is a side view of the screw-eye detached. Fig. 4 shows the plate from which the screw-eye and stop are formed, and Fig. 5 shows the pin and eye set together.

The pin *a* is made with the T end 2 by upsetting the metal, slitting, and spreading the same by suitable dies, and the point is made at the other end. The screw-eye is made of a metal plate, *b*, cut out as in Fig. 4, with a mortise, 4, and wings 5, and these parts are bent up to form the eye at the central fold, as seen in Fig. 3, the pin being inserted through the mortise 4, and the T end occupying the portions of the eye at each side of the mortise. The portion of the screw-eye at 6 forms a stop, upon which the pin rests when swung toward the ornament, so that the end of the pin may be sprung down beneath the catch *e*, and hence it will not be liable to become unhooked. The wings 5 5 are closed toward each other, and compressed in suitable dies into a round screw, and this is screwed into the material of the breast-pin or ornament.

I claim as my invention—

1. The screw-eye for the pin of an ornament, made of a folded piece of sheet metal with a stop, 6, for the pin and a screw-shank formed of the wings 5 5, as and for the purposes specified.

2. The pin *a* with a T-head and point, in combination with the screw-eye made of sheet metal, with a mortise for the pin and a stop, 6, substantially as set forth.

Signed by me this 14th day of November, A. D. 1873.

JOHN P. COURTNEY.

Witnesses:
GEO. T. PINCKNEY,
CHAS. H. SMITH.